United States Patent
Nooli et al.

(10) Patent No.: US 11,717,785 B2
(45) Date of Patent: Aug. 8, 2023

(54) HYBRID NITROGEN GAS GENERATION SYSTEM

(71) Applicant: Frito-Lay North America, Inc., Plano, TX (US)

(72) Inventors: Praveen K. Nooli, Frisco, TX (US); Phillip S. Frazier, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 95 days.

(21) Appl. No.: 17/502,619

(22) Filed: Oct. 15, 2021

(65) Prior Publication Data

US 2023/0119185 A1 Apr. 20, 2023

(51) Int. Cl.
*B01D 53/047* (2006.01)
*B01D 53/22* (2006.01)
*A23L 3/3409* (2006.01)
*A23L 3/3418* (2006.01)
*B65B 25/00* (2006.01)

(52) U.S. Cl.
CPC .......... *B01D 53/047* (2013.01); *A23L 3/3418* (2013.01); *A23L 3/34095* (2013.01); *B01D 53/22* (2013.01); *B01D 53/229* (2013.01); *B65B 25/001* (2013.01); *B01D 2256/10* (2013.01); *B01D 2257/104* (2013.01); *B01D 2259/40009* (2013.01)

(58) Field of Classification Search
CPC ...... B01D 53/04; B01D 53/047; B01D 53/22; B01D 53/229; B01D 2256/10; B01D 2257/104; B01D 2259/40009; B65B 25/001; A23L 3/34095; A23L 3/3418
USPC .... 96/4, 7, 10, 121, 134; 95/43, 47, 96, 138
See application file for complete search history.

(56) References Cited

U.S. PATENT DOCUMENTS

| | | | |
|---|---|---|---|
| 4,690,695 A | * | 9/1987 | Doshi .................. B01D 53/047 95/55 |
| 4,701,187 A | | 10/1987 | Choe |
| 5,429,664 A | | 7/1995 | Lee |
| 2004/0103782 A1 | * | 6/2004 | Wascheck ............... C07C 7/144 96/135 |

(Continued)

FOREIGN PATENT DOCUMENTS

| WO | 96/01679 | 1/1996 |
|---|---|---|
| WO | 2007/023761 | 3/2007 |

OTHER PUBLICATIONS

International Search Report and Written Opinion issued in PCT/US2022/041213 dated Jan. 9, 2023.

(Continued)

*Primary Examiner* — Frank M Lawrence, Jr.
(74) *Attorney, Agent, or Firm* — Barnes & Thornburg LLP; John Routon

(57) ABSTRACT

A hybrid nitrogen gas generation system includes a membrane nitrogen gas generator and a pressure swing absorption nitrogen generator. A gas comprising nitrogen is purified to a first nitrogen purity using one of the membrane nitrogen gas generator and the pressure swing absorption nitrogen generator. The gas is either bypassed around the other of the membrane nitrogen gas generator and the pressure swing absorption nitrogen generator to provide the gas having the first nitrogen purity or the gas is purified to a second nitrogen purity using the other of the membrane nitrogen gas generator and the pressure swing absorption nitrogen generator.

17 Claims, 7 Drawing Sheets

(56) References Cited

U.S. PATENT DOCUMENTS

| | | | |
|---|---|---|---|
| 2004/0216609 A1* | 11/2004 | Baksh | B01D 53/0462 96/111 |
| 2011/0204089 A1* | 8/2011 | Shettle | B67D 1/0468 222/394 |
| 2015/0165370 A1* | 6/2015 | Peake | B01D 53/268 96/121 |
| 2018/0214725 A1* | 8/2018 | Tihen | B01D 69/08 |
| 2020/0131647 A1* | 4/2020 | Leitmayr | C25B 15/08 |

OTHER PUBLICATIONS

Akinlabi et al., "Modelling, design and optimisation of a hybrid PSA-membrane gas separation process," Computer-Aided Chemical Engineering, Jan. 1, 2007, vol. 24, pp. 363-370.

* cited by examiner

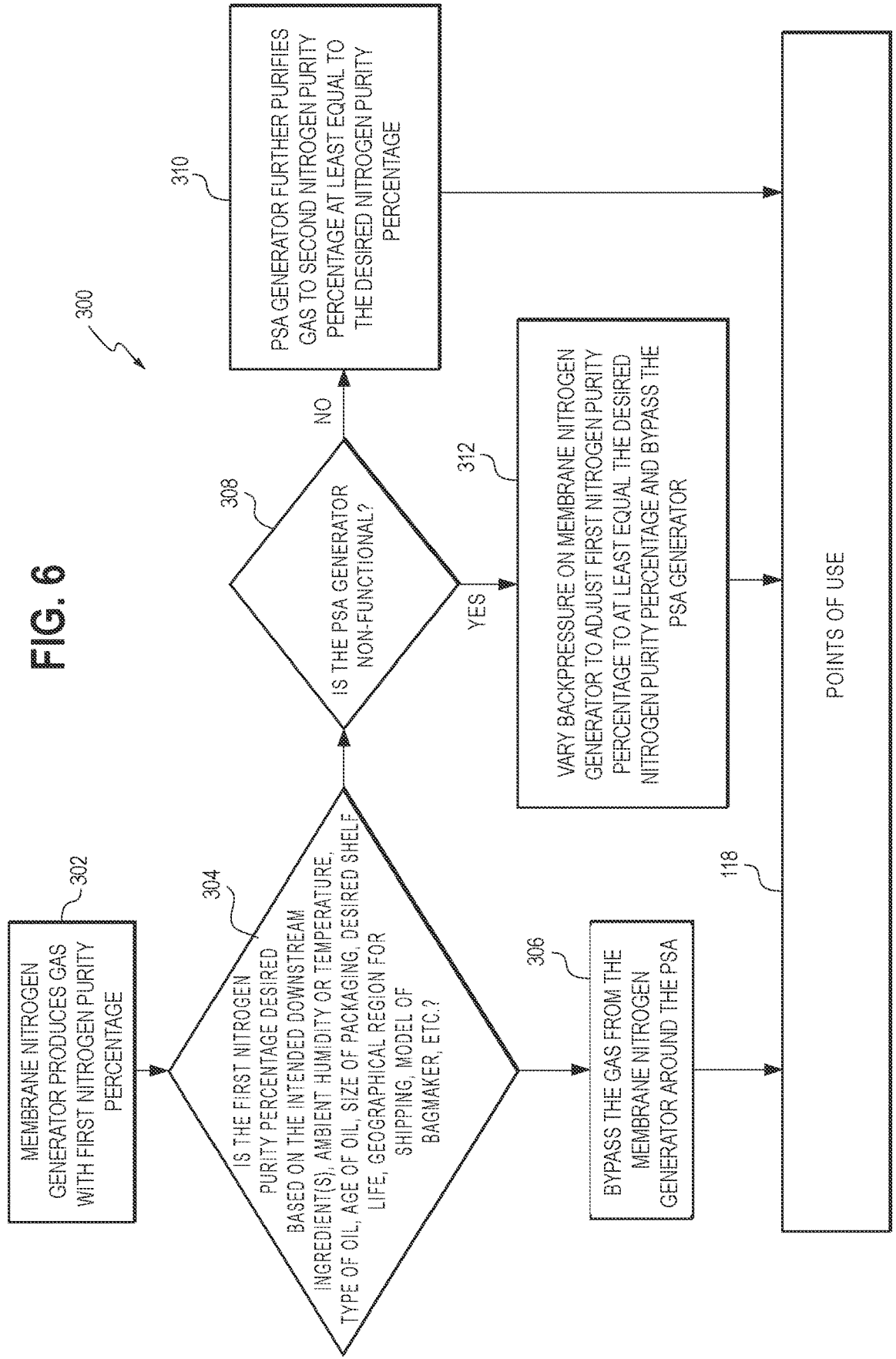

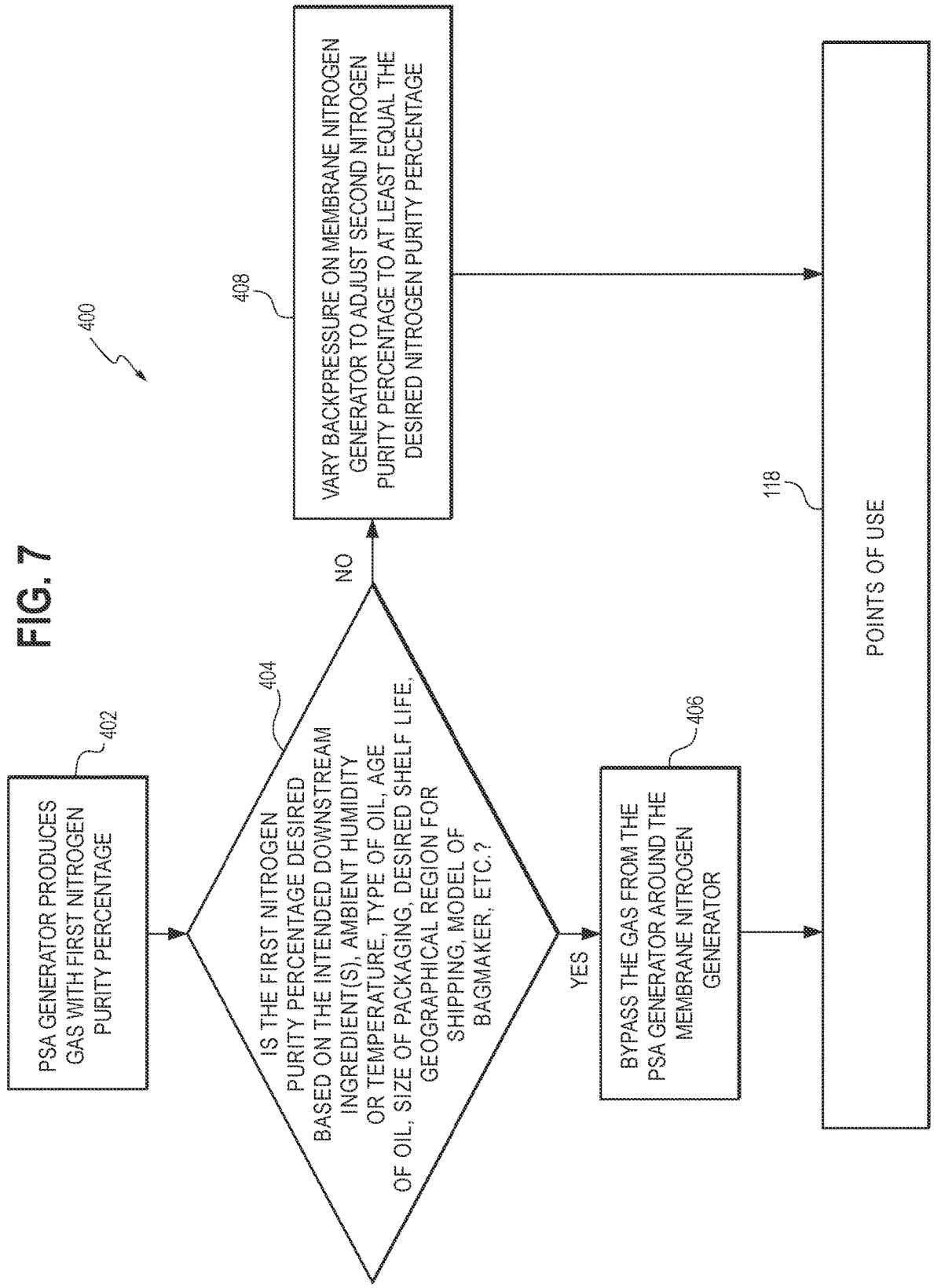

HYBRID NITROGEN GAS GENERATION SYSTEM

TECHNICAL FIELD

A system and method for generating purified nitrogen gas are described. In particular, the nitrogen gas generation system and method provide nitrogen gas with a desired and variable nitrogen purity for use in the food industry.

BACKGROUND

Nitrogen gas is used in the food industry for a variety of applications. For example, nitrogen gas is used in the packaging of potato chips and other snacks to extend the shelf life of the packaged food. Nitrogen gas may also be used to blanket or sparge oil that is used in the processing of foods to prevent or reduce oxidation of the oil. Conventional food packaging facilities either have purified nitrogen gas delivered to the facility or use a pressure swing absorption system or a membrane system configured to purify nitrogen gas using ambient air. When producing gas with relatively high nitrogen purity, pressure swing absorption systems typically use lower compressed air to nitrogen than the less efficient membrane systems. However, membrane systems are often simpler and cheaper. It would be desirable to provide a nitrogen generation system that provides high purity nitrogen, capital cost savings, and a back-up system.

SUMMARY

Aspects and embodiments of the described hybrid nitrogen gas generation system and methods are set out in the appended claims. These and other aspects and embodiments of the inventive hybrid system and method are also described below.

In one aspect, a hybrid nitrogen gas generation system that is configured to provide purified nitrogen gas is described. The system includes a membrane nitrogen generator, a pressure swing absorption nitrogen generator, and a purity control valve assembly. The membrane nitrogen generator includes a vessel and, in some embodiments, a plurality of fibers located in the vessel. The pressure swing absorption nitrogen generator includes two towers such that at any particular time, one tower is configured to purify the nitrogen gas. The membrane nitrogen generator and the pressure swing absorption nitrogen generator may be arranged such that the membrane nitrogen generator is upstream of the pressure swing absorption nitrogen generator or vice versa. The purity control valve assembly is fluidly connected between the membrane nitrogen generator and the pressure swing absorption nitrogen generator and configured to either direct the gas from the upstream generator to the downstream generator for further purification or bypass the downstream generator to provide nitrogen gas as purified by the upstream generator.

In one embodiment, the membrane nitrogen generator is connected upstream of the pressure swing absorption nitrogen generator and treated compressed air is directed into the membrane nitrogen generator. The membrane nitrogen generator purifies the air to provide nitrogen gas with a first nitrogen purity. The first nitrogen purity can be varied to be lower or higher by altering the backpressure of the membrane nitrogen generator.

In this instance, if the first nitrogen purity is insufficient for the desired downstream point of use of the nitrogen gas, the purity control valve assembly may direct the nitrogen gas having the first nitrogen purity into the pressure swing absorption nitrogen generator so that the pressure swing absorption nitrogen generator further purifies the gas to a second nitrogen purity level. However, if the first nitrogen purity is sufficiently high for the desired downstream point of use of the nitrogen gas, the purity control valve assembly may bypass the pressure swing absorption nitrogen generator and direct the nitrogen gas to the downstream point of use. Additionally, if the pressure swing absorption nitrogen generator becomes non-functional, the backpressure of the membrane nitrogen generator may be varied to lower or raise the purity of the nitrogen gas exiting the membrane nitrogen generator and the pressure swing absorption nitrogen generator may be bypassed.

In another embodiment, the pressure swing absorption nitrogen generator is connected upstream of the membrane nitrogen generator and treated compressed air is directed into the pressure swing absorption nitrogen generator. The pressure swing absorption generator purifies the air to provide nitrogen gas with a first nitrogen purity.

The first nitrogen purity may be set at a minimum desired purity level. The membrane nitrogen generator is connected between the pressure swing absorption nitrogen generator and the downstream point of use and is configured to further purify the nitrogen gas to the nitrogen purity percentage desired for the specific point of use. In this way, a membrane nitrogen generator can be connected with pressure swing absorption nitrogen generator for each downstream point of use and the nitrogen gas for each downstream point of use may be purified to a unique nitrogen purity. If the first nitrogen purity is sufficiently high for all scheduled downstream points of use of the nitrogen gas or if one or more membrane nitrogen generators is non-functional, the purity control valve assembly may bypass the membrane nitrogen generator(s) and direct the nitrogen gas to the downstream point(s) of use.

In other aspects, a method of operating a hybrid nitrogen gas generation system is described. The method may include directing a gas comprising nitrogen into one of a pressure swing absorption nitrogen generator and a membrane nitrogen generator to purify the gas to a first nitrogen purity, and directing the gas into the other one of the pressure swing absorption nitrogen generator and the membrane nitrogen generator to purify the gas to a second nitrogen purity after directing the gas into the one of the pressure swing absorption nitrogen generator and the membrane nitrogen generator. The method may also include bypassing the gas around the other one of the pressure swing absorption nitrogen generator and the membrane nitrogen generator.

The invention extends to methods, systems, kits of parts and apparatus substantially as described herein and/or as illustrated with reference to the accompanying figures.

The invention extends to any novel aspects or features described and/or illustrated herein. In addition, apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

DESCRIPTION OF THE DRAWINGS

The foregoing aspects and many of the attendant advantages of the present technology will become more readily appreciated by reference to the following Description, when taken in conjunction with the accompanying simplified drawings of exemplary embodiments. The illustrative, schematic drawings, briefly described below, are not to scale, are presented for ease of explanation and do not limit the scope of the inventions recited in the accompanying claims.

FIG. 6 is a diagrammatic view of an example flow chart for a controller included in the hybrid nitrogen gas generation system of FIG. 2.

FIG. 7 is a diagrammatic view of an example flow chart for a controller included in the hybrid nitrogen gas generation system of FIG. 5.

DESCRIPTION

Hybrid nitrogen gas generation systems (or circuit) 10, 210 in accordance with the present disclosure is adapted for use in a nitrogen gas purification circuit 110 as shown in FIGS. 1-5. The nitrogen gas purification circuit 110 is configured to purify a gas 20 comprising nitrogen ($N_2$) gas, such as ambient air for example. The gas 20 may enter the nitrogen gas purification circuit 110 with a nitrogen purity of about 78 percent. The nitrogen gas purification circuit 110 is adapted to purify the gas 20 to provide a nitrogen purity of about 95 percent or greater in some embodiments. The purified gas 20 is used in industrial operations, for example, to preserve food ingredients used in packaged food goods. As used herein, nitrogen purity is the volume of nitrogen in a unit volume of air or gas and is typically expressed as a percentage. For example, 95 percent nitrogen purity implies that in 1 liter of the gas 20, 0.95 liters of the gas 20 is nitrogen.

The hybrid nitrogen gas generation system 10 is configured to control the nitrogen purity of the gas 20 provided by the circuit 110 so that a desired threshold nitrogen purity is met for a given use of the gas 20 without purifying the gas 20 beyond the threshold nitrogen purity. In this way, the amount of time and energy for producing the purified gas 20 is minimized and additional time and energy is not used to purify the gas 20 beyond the purity desired or necessary for the intended use.

As one example, the hybrid nitrogen gas generation system 10 of the present application provides gas 20 having a nitrogen purity of about 98.0 to about 99.5 percent, for example, to flush bags being filled with food products. The same hybrid nitrogen gas generation system 10 can be controlled to provide gas 20 having a nitrogen purity of about 95 percent to about 97 percent, for example, to sparge or blanket oil and oil tanks.

In contrast, conventional nitrogen gas purification systems are configured to provide gas at a set nitrogen purity and are not configured to adjust the nitrogen purity of the gas. A single nitrogen purity is typically set as the highest nitrogen purity for any point of use of the gas in the industrial operation. In yet other conventional facilities, purified nitrogen gas is delivered to the facility from an off-site purifier such as a third party producer. The delivered purified nitrogen gas has a set nitrogen purity that is used for all applications at the facility. One of skill will appreciate that providing high purity nitrogen for applications in which a lower purity nitrogen would be satisfactory is not cost effective.

Figure 1:
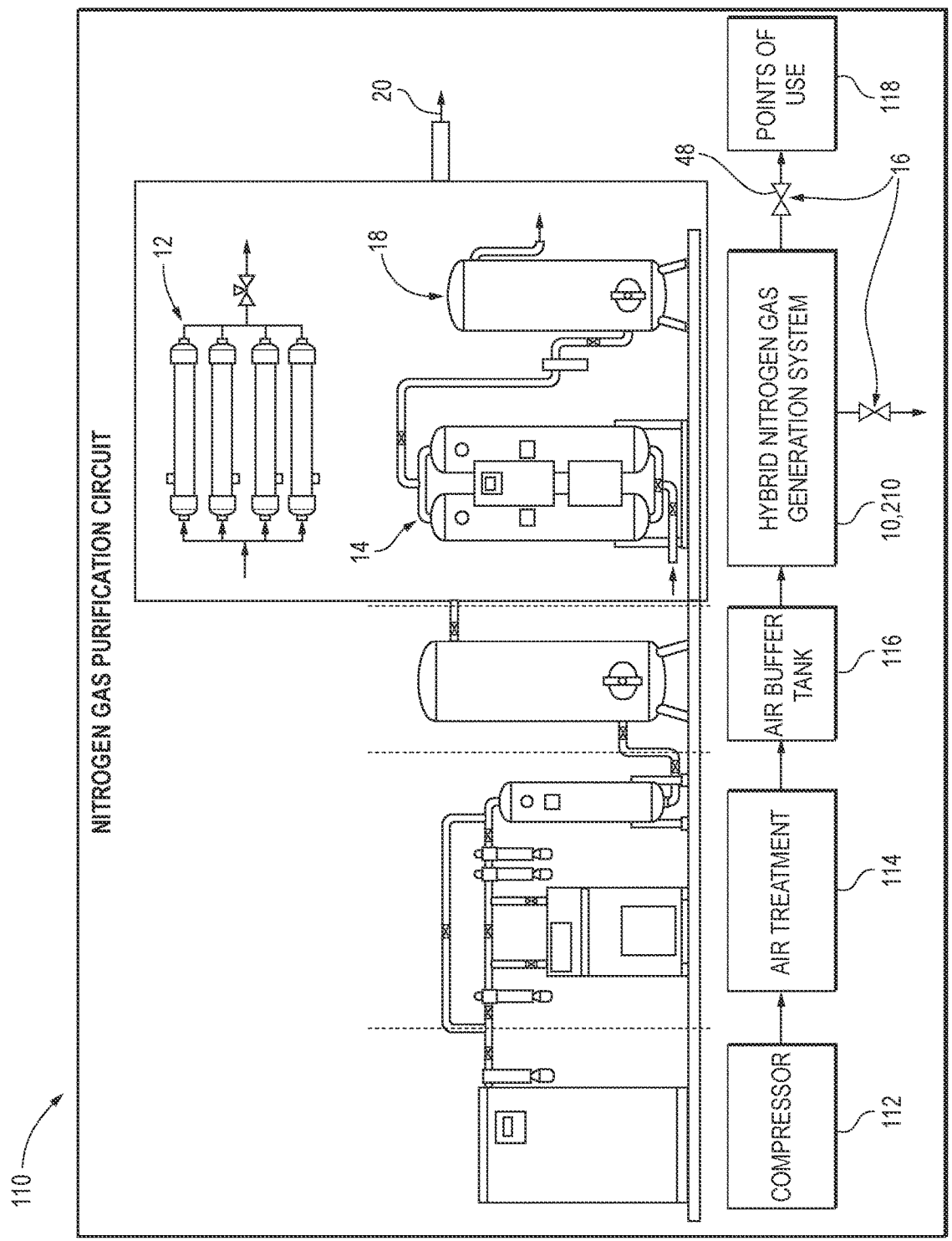
FIG. 1 is a diagrammatic view of a nitrogen gas purification circuit having a hybrid nitrogen generation system in accordance with the present disclosure.

Referring to FIG. 1, the nitrogen gas purification circuit 110 includes a compressor 112, an air treatment unit 114, an air buffer tank 116, and the hybrid nitrogen gas generation system 10. The compressor 112 receives gas 20 such as ambient air and compresses the gas 20 to raise the pressure of the gas 20. The air treatment unit 114 conditions the gas 20 to a desired temperature and/or humidity and, in some embodiments, filters particles out of the gas 20. The air buffer tank 116 stores the filtered and conditioned gas 20 and conducts the gas 20 to the hybrid nitrogen gas generation system 10. The hybrid nitrogen gas generation system 10 purifies the gas 20 to increase the nitrogen purity of the gas 20 that may be used at a downstream point of use 118 of an industrial application. The nitrogen gas purification system 110 further includes valves and control systems to control the flow of the gas 20 through the system 110.

Figure 2:
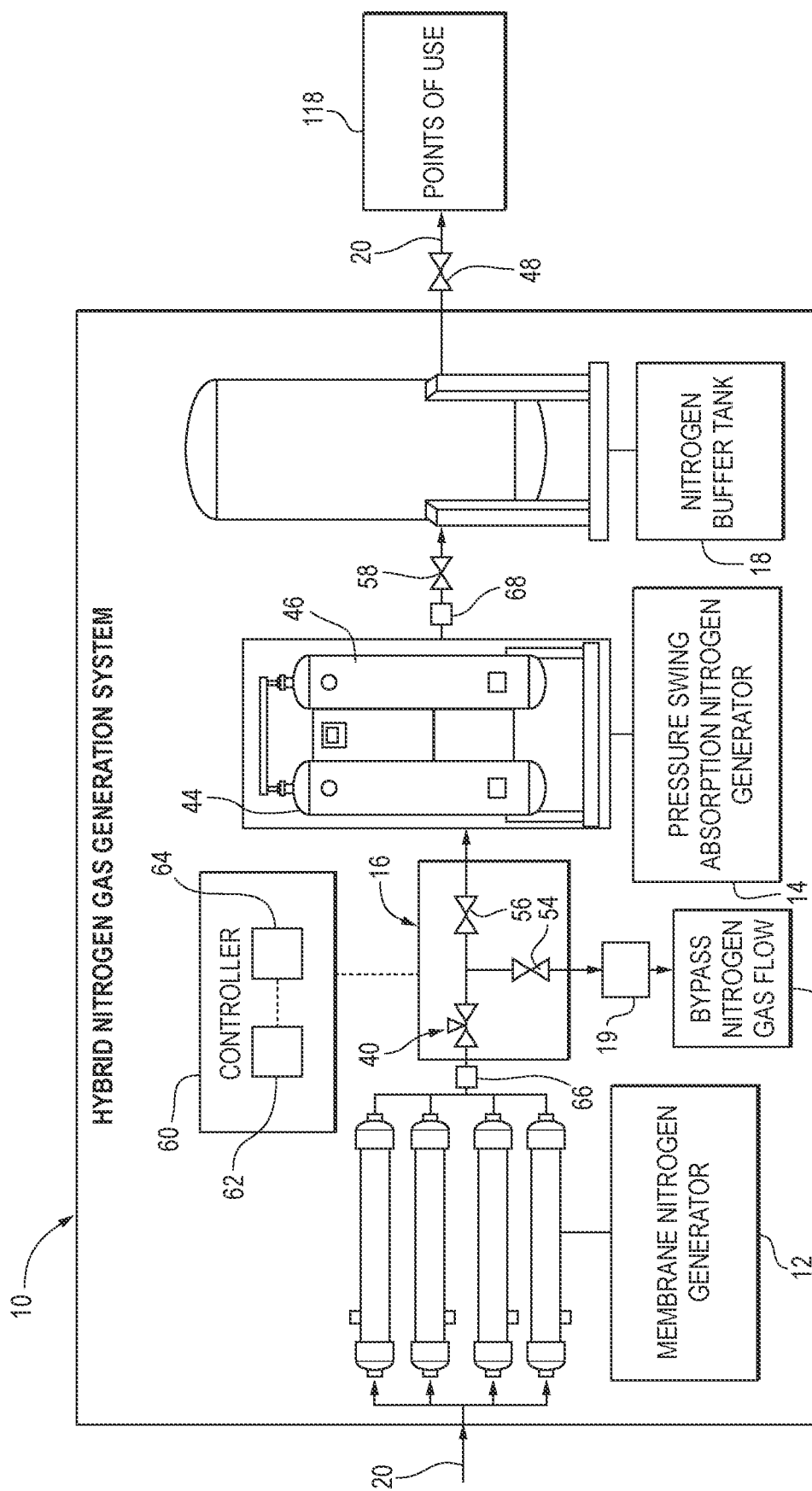
FIG. 2 is a diagrammatic view of a first embodiment of a hybrid nitrogen generation system having a membrane nitrogen generator and a pressure swing absorption nitrogen generator connected in series with and downstream of the membrane nitrogen generator.

The hybrid nitrogen gas generation system 10 includes a membrane nitrogen generator 12, a pressure swing absorption nitrogen generator 14, and a purity control valve assembly 16, as shown in FIG. 2. The membrane nitrogen generator 12 and the pressure swing absorption nitrogen generator 14 purify the gas 20 using different principles of operation. In some embodiments, the gas 20 is conducted first through the membrane nitrogen generator 12 and then through the pressure swing absorption nitrogen generator 14 to further purify the gas 20 as shown in FIG. 2. In other embodiments, the gas 20 is conducted first through the pressure swing absorption nitrogen generator 14 and then through the membrane nitrogen generator 12 to further purify the gas 20 as shown in the hybrid nitrogen gas generation system 210 in FIG. 5. The purity control valve assembly 16 is connected between the membrane nitrogen generator 12 and the pressure swing absorption nitrogen generator 14 and is configured to conduct the gas 20 to the downstream nitrogen generator 12 or 14 or to bypass the downstream nitrogen generator 12 or 14 so that the gas 20 can be used in the downstream points of use 118.

Figure 3:
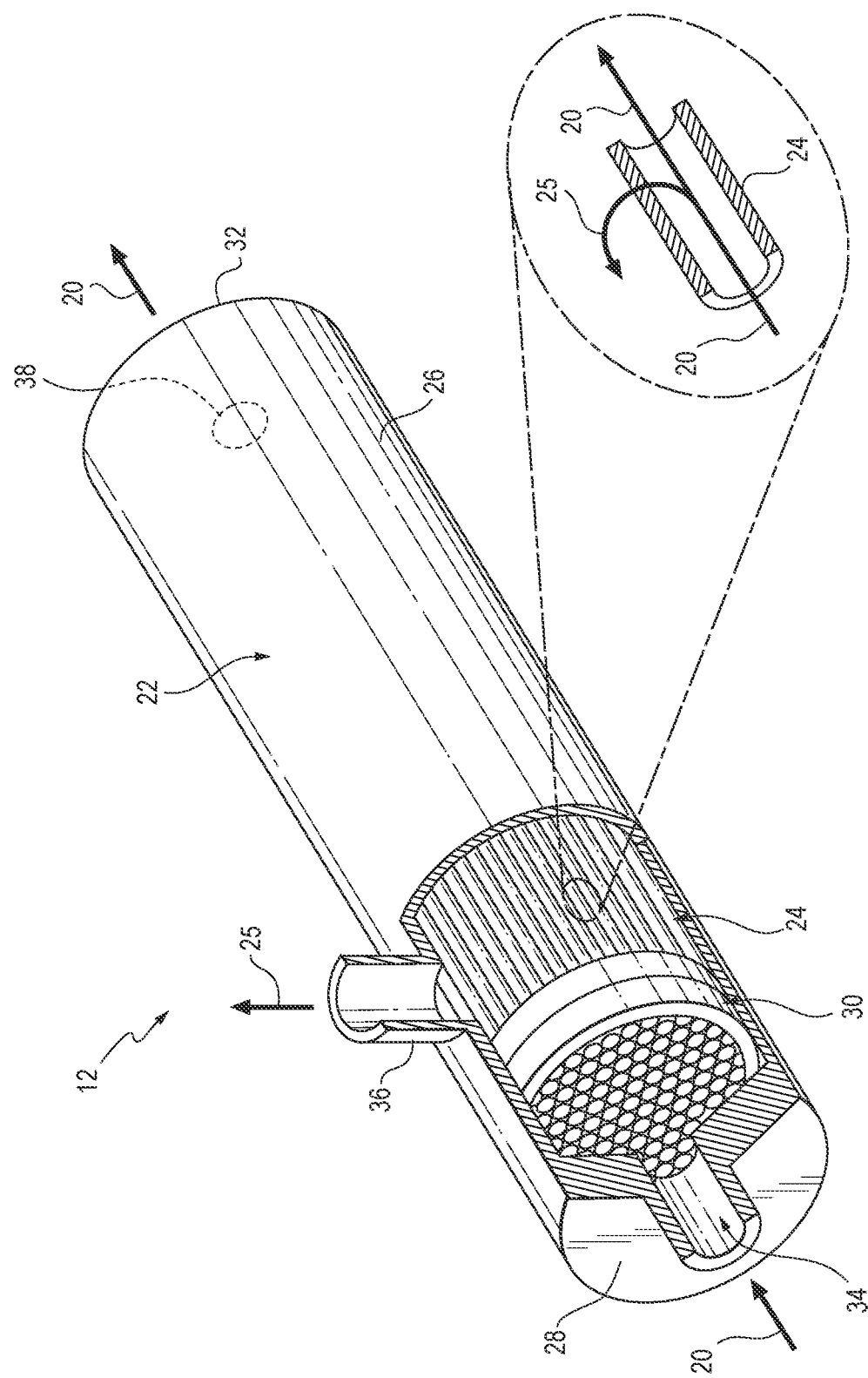
FIG. 3 is a perspective view of a portion of the membrane nitrogen generator having a vessel and a plurality of fibers located in the vessel and configured to selectively permeate gases flowing through the fibers to provide gas with higher nitrogen purity.
Figure 4:
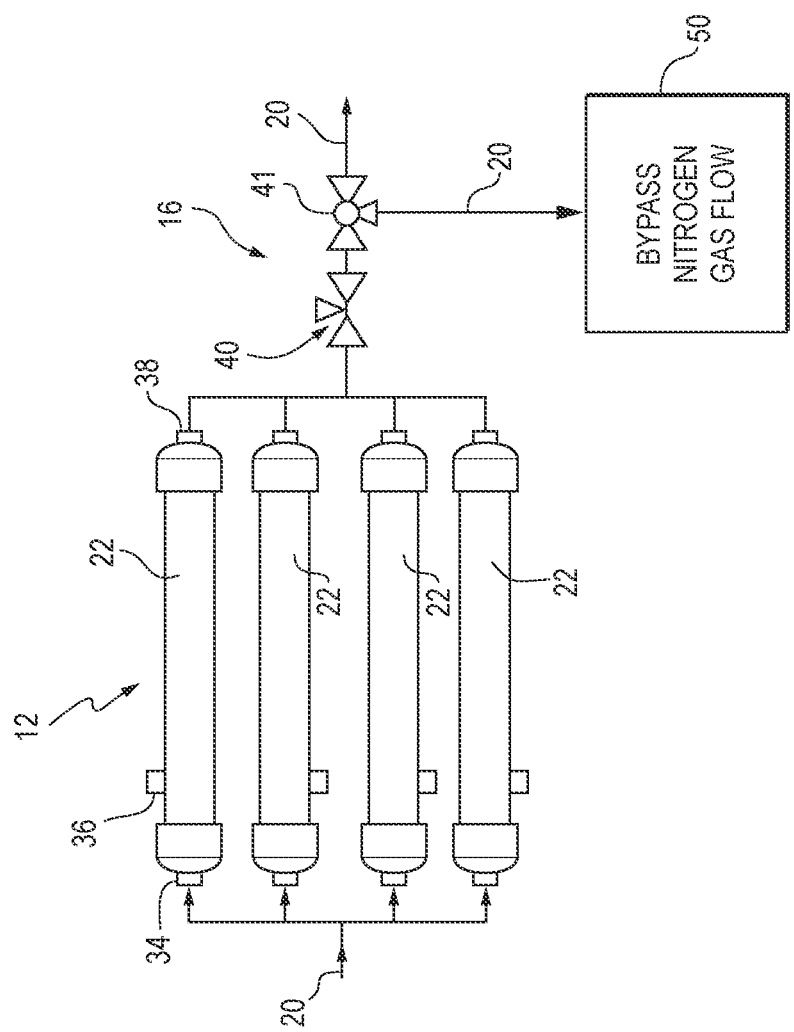
FIG. 4 is a perspective view of the hybrid nitrogen generation system of FIG. 2 with a purity control valve assembly having a three-way valve in place of a multi-valve arrangement.

The membrane nitrogen generator 12 includes a vessel 22 and a plurality of fibers 24 (sometimes called a membrane filter and/or permeable membrane) located within the vessel 22 as suggested in FIGS. 3 and 4. In illustrative embodiments, the membrane nitrogen generator 12 includes a plurality of vessels 22 with fibers 24 located within each vessel 22 so that a desired maximum flow rate capacity of the membrane nitrogen generator 12 is met as shown in FIGS. 2 and 4. Each of the plurality of fibers 24 is porous and, as the gas 20 is conducted through the vessel 22, gases 25 with faster permeation rates, such as oxygen and carbon dioxide, permeate out of the membrane nitrogen generator 12 faster than nitrogen.

As a result, the gas 20 exiting the vessel 22 has a higher nitrogen purity than the gas 20 entering the vessel 22.

In illustrative embodiments, the plurality of vessels 22 of the membrane nitrogen generator 12 are arranged in parallel. In other embodiments, the plurality of vessels 22 of the membrane nitrogen generator 12 are arranged in series with one another. In some embodiments, the plurality of vessels 22 of the membrane nitrogen generator 12 are arranged with some in parallel and others in series. In some embodiments, the membrane nitrogen generator 12 includes a single vessel 22 with fibers 24 located within the single vessel 22.

In the illustrative embodiment, the vessel 22 includes an outer shell 26, an end plate 28, a fiber retainer assembly 30, and an end plate 32 as shown in FIG. 3. The end plates 28, 32 are located at opposite ends of the outer shell 26 and control flow into and out of the outer shell 26. The fiber retainer assembly 30 supports the fibers 24 within the outer shell 26. The membrane nitrogen generator 12 may have other structures and arrangements in other embodiments.

The end plate 28 is formed to include an inlet 34 that allows the gas 20 to flow into the outer shell 26 as shown in FIG. 3. The outer shell 26 is formed to include a permeate outlet 36 that allows the gases 25 having the faster permeation rates, such as oxygen and carbon dioxide, to permeate out of the membrane nitrogen generator 12. The end plate 32 is formed to include a retentate outlet 38 that allows the gas 20 to exit the outer shell 26 with a nitrogen concentration that is greater than the nitrogen concentration of the gas 20 entering the shell 26.

The fiber retainer assembly 30 includes outer tubes that engage the fibers 24 and limit movement of the fibers 24. The outer tubes may be ring shaped and may be called an epoxy tube sheet. In some embodiments, the fiber retainer assembly 30 includes a core rod that passes through the fibers 24. The core rod may include a fluid passage configured to direct the gas 20 from the inlet 34 through the outer tube and to direct the gas 20 to the fibers 24.

The membrane nitrogen generator 12 further includes a backpressure valve 40 as shown in FIGS. 2 and 4. The backpressure valve 40 is fully adjustable to control the backpressure acting on the membrane nitrogen generator 12. Illustratively, the membrane nitrogen generator 12 includes a single backpressure valve 40 that is fluidly connected to each vessel 22, as shown in FIG. 4. In some embodiments, the backpressure valve 40 is included in the purity control valve assembly 16. Other features for slowing the gas 20 through the membrane nitrogen generator 12 may be employed in other embodiments such as valving for controlling the pressure of the gas 20 at the inlet of the membrane nitrogen gas generator. The backpressure valve 40 may be the same as the valve 48 (248) for controlling flow of the gas 20 to the points of use 118, for example, in the system embodiment shown in FIG. 5.

The nitrogen purity of the gas 20 exiting the membrane nitrogen generator 12 may be varied by adjusting the backpressure on the membrane nitrogen generator 12 with the backpressure valve 40 or valve 48. Increasing the backpressure will force a greater amount of permeate gases 25 to exit the gas 20 and, thus, increase the nitrogen purity of the gas 20 in response to the gas 20 moving slower through the fibers 24 (the gas will experience a greater residence time). The nitrogen purity of the gas 20 may be decreased by reducing the backpressure with the backpressure valve 40 or valve 48. As described below, it may be desirable to vary the nitrogen purity of the gas 20 exiting the membrane nitrogen generator 12 based on a specific downstream point of use 118 of the gas 20 and/or if the pressure swing absorption gas generator 14 is non-functional.

The pressure swing absorption gas generator 14 includes a first tower 44 and a second tower 46 as shown in FIG. 2. The first tower 44 and the second tower 46 may be any vessel or other structure for receiving gas 20 such as, for example, a cylinder tank. The first tower 44 and the second tower 46 may be arranged vertically or horizontally relative to their major axes. The pressure swing absorption gas generator 14 cycles between each tower 44, 46 to produce purified nitrogen gas. Each tower 44, 46 includes an absorbent material such a carbon molecular sieve. The gas 20 (treated ambient air or pre-purified gas 20 from the membrane nitrogen generator 12) is conducted into one of the towers 44, 46 where the oxygen and other gases in the gas 20 are trapped in the absorbent material. The nitrogen in the gas 20 flows through the absorbent material such that the remaining (non-trapped) gas is purified nitrogen gas 20. A portion of the purified nitrogen gas 20 is directed into the other tower 46, 44 in the opposite direction to purge the oxygen and other gases trapped in the absorbent material to allow the other tower to be used for nitrogen purification in the next cycle step.

The cycle time of the pressure swing absorption gas generator 14 can be adjusted to vary the nitrogen purity of the gas 20. As such, the pressure swing absorption gas generator 14 can take gas (including either ambient air or pre-purified gas 20 from the membrane nitrogen generator 12) and purify the gas 20 to a desired nitrogen purity. In some embodiments, the pressure swing absorption gas generator 14 provides a nitrogen purity of about 99.99 percent. In some embodiments, the pressure swing absorption gas generator 14 provides a nitrogen purity of about 99.5 percent, about 98.5 percent, about 98 percent, about 97 percent, about 96 percent, or about 95 percent.

In the illustrative embodiment, the hybrid nitrogen gas generation system 10 further includes a nitrogen buffer tank 18 connected downstream of the pressure swing absorption nitrogen generator 14, as shown in FIG. 2. The pressure swing absorption nitrogen generator 14 produces purified nitrogen gas 20 in cycles. The nitrogen buffer tank 18 stores a buffer amount of purified nitrogen gas 20 so that a continuous flow of the gas 20 can be delivered to the points of use 118 instead of cycles of purified gas 20 directly from the pressure swing absorption nitrogen generator 14. The hybrid nitrogen gas generation system 10 further includes one or more valves 48 fluidly connected between the pressure swing absorption nitrogen generator 14/buffer tank 18 and the points of use 118.

The purity control valve assembly 16 is fluidly connected between the membrane nitrogen generator 12 and the pressure swing absorption nitrogen generator 14 as shown in FIG. 2. The purity control valve assembly 16 is configured to selectively direct the purified gas 20 from the membrane nitrogen generator 12 to the pressure swing absorption generator 14 or to bypass a flow 50 of the purified gas 20 around the pressure swing absorption nitrogen generator 14. In some embodiments, the hybrid nitrogen gas generation system 10 further includes a buffer tank 19 for the flow 50 of bypass gas to store a buffer amount of purified nitrogen gas 20.

In some embodiments, the purity control valve assembly 16 includes a three-way valve 41 coupled between the membrane nitrogen generator 12 and the pressure swing absorption nitrogen generator 14 as shown in FIG. 4. In other embodiments, the purity control valve assembly 16 includes a first conduit with a valve 54 for bypassing the pressure swing absorption nitrogen generator 14 and a second conduit with a valve 56 coupled between the membrane nitrogen generator 12 and pressure swing absorption nitrogen generator 14, as shown in FIG. 2.

The purity control valve assembly 16 further includes a valve 58 located fluidly between the pressure swing absorption nitrogen generator 14 and the buffer tank 18 as shown in FIG. 2. The valve 58 is used to vary a backpressure on the pressure swing absorption nitrogen generator 14 (similar to the valve 40 acting on the membrane nitrogen generator 12) to allow the valve 58 to adjust the nitrogen purity of the gas 20 exiting the pressure swing absorption nitrogen generator 14.

The membrane nitrogen generator 12 purifies the gas 20 to a first nitrogen purity as suggested in FIG. 2. The membrane nitrogen generator 12 may be able to purify the gas 20 relatively efficiently up to a certain nitrogen purity level, i.e., a first nitrogen purity. The first nitrogen purity may be about 95 percent purity. The gas 20 can then be directed, via the purity control valve assembly 16, to the pressure swing absorption nitrogen generator 14 to further purify the gas 20 to a second nitrogen purity. The pressure swing absorption nitrogen generator 14 will be more efficient at increasing the nitrogen purity level when the incoming gas contains a nitrogen concentration that is greater than that present in ambient air. In some scenarios, the first nitrogen purity is sufficient for certain points of use 118. As such, the purity control valve assembly 16 can bypass the pressure swing absorption nitrogen generator 14 and deliver the gas 20 with the first nitrogen purity (chosen by the operator or valve assembly 16 to be relatively low in this example) to the points of use 118 thereby saving the energy of the pressure swing absorption nitrogen generator 14.

Additionally, the backpressure valve 40 (or other means) can be used to increase the first nitrogen purity content of the gas 20 exiting the membrane nitrogen generator 12. The purity control valve assembly 16 can bypass the flow 50 of the gas 20 around the pressure swing absorption nitrogen generator 14 while still providing a gas with a relatively high nitrogen purity. The tradeoff can be that this relatively high nitrogen purity gas is produced with the membrane nitrogen generator 12 less efficiently as compared to achieving the same nitrogen purity with the pressure swing absorption nitrogen generator 14. Though less efficient, this bypass flow 50 can be desired and beneficial if the pressure swing absorption nitrogen generator 14 is non-functional, for example. In this way, the membrane nitrogen generator 12 can produce gas 20 having a nitrogen purity of up to about 100 percent.

The hybrid nitrogen gas generation system 10 further includes a controller 60 connected with the purity control valve assembly 16. In other embodiments, the purity control valve assembly 16 may be adjusted manually. The controller 60 includes a memory 62 having instructions stored thereon and a processor 64 connected with the memory 62 and programmed to run the instructions stored on the memory 62. In some embodiments, the controller 60 is connected with the pressure swing absorption nitrogen generator 14 and configured to control the cycle time. In some embodiments, the controller 60 is connected with other valves included in the system 10 to adjust the flow of gas 20 and to control which of the points of use 118 the gas 20 is delivered.

The controller 60 further includes a sensor array 66 and a sensor array 68 as shown in FIG. 2. The sensor array 66 is located downstream of the membrane nitrogen generator 12 and upstream of the pressure swing absorption nitrogen generator 14. The sensor array 68 is located downstream of the pressure swing absorption nitrogen generator 14. The sensor arrays 66, 68 each include one or more sensors for determining a flow rate of the gas 20 exiting the generators 12, 14, respectively and for determining the nitrogen purity of the gas 20 exiting the generators 12, 14, respectively. The controller 60 is programmed to make decisions and control the purity control valve assembly 16 based on the flow rate and/or nitrogen purity of the gas 20 as determined with the sensor arrays 66, 68.

In the illustrative embodiment, the sensor arrays 66, 68 each include an oxygen sensor that detects the oxygen content in the gas 20. The controller 60 uses the oxygen content of the gas 20 to determine the nitrogen purity of the gas 20. As an example, the sensor array 66 may detect 5 percent oxygen in the gas 20 after the gas 20 exits the membrane nitrogen generator 12 and, therefore, the controller 60 determines the gas 20 has a nitrogen purity of 95 percent. The sensor array 68 may detect 1 percent oxygen in the gas 20 after the gas 20 exits the pressure swing absorption nitrogen generator 14 and, therefore, the controller 60 determines the gas 20 exiting the pressure swing absorption nitrogen generator 14 has a nitrogen purity of 99 percent.

A flow diagram 300 is shown in FIG. 6 showing illustrative instructions for the memory 62. At step 302, the membrane nitrogen generator 12 produces gas with the first nitrogen purity. At step 304, the controller 60 determines if the first nitrogen purity is desired for the points of use 118. If so, the gas 20 is bypassed around the pressure swing absorption generator 14 to the point(s) of use 118 at step 306. If not, the controller 60 checks if the pressure swing absorption generator 14 is non-functional at step 308, for example, based on the flow rate and/or nitrogen purity of the gas 20 exiting the pressure swing absorption generator 14. If the pressure swing absorption generator 14 is functional, the controller 60 directs the gas 20 to the pressure swing absorption generator 14 and controls the cycles thereof to produce the gas 20 with a second nitrogen purity at least equal to the desired nitrogen purity at step 310. The gas 20 is then directed to the points of use 118. If the pressure swing absorption generator 14 is non-functional, the controller 60 varies the backpressure on the membrane nitrogen generator 12 to obtain the desired nitrogen purity and then bypasses the gas around the pressure swing absorption generator 14 to the points of use 118 at step 312.

A number of examples and scenarios for the controller 60 are provided below. The controller 60 may be programmed for any one, any combination, or all such examples for the systems 10, 210.

The controller 60 is configured to determine a calculated nitrogen purity and a flow rate of the gas 20 exiting the pressure swing absorption nitrogen generator 14. The determination may be calculated values or based on a lookup table stored in memory 62 using measurements from the system 10, 210. In some embodiments, the memory 62 includes instructions that, when executed by the processor 64, cause the controller 60 to cause the purity control valve assembly 16 to bypass the gas 20 around the pressure swing absorption nitrogen generator 14 in response to at least one of the second nitrogen purity being less than a predetermined threshold nitrogen purity and a flow rate of the gas 20 exiting the pressure swing absorption nitrogen generator 14 being below a predetermined flow rate. As such, the controller 60 bypasses the flow 50 of gas 20 around the pressure swing absorption nitrogen generator 14 in response to the controller 60 detecting that the pressure swing absorption nitrogen generator 14 is non-functional.

The controller 60 is further programmed to cause the purity control valve assembly 16 to increase a backpressure of the membrane nitrogen generator 12 using the backpressure valve 40 in response to the second nitrogen purity being less than the predetermined threshold nitrogen purity to further cause the first nitrogen purity of the gas 20 exiting the membrane nitrogen generator 12 to be increased. As such, the membrane nitrogen generator 12 can be used as a backup system and provide higher purity nitrogen if the pressure swing absorption generator 14 is not-functional. It is noted that the system 10 can be used in this way for any reason and the pressure swing absorption generator 14 need not be not-functional.

In some embodiments, the predetermined threshold nitrogen purity is about 95 percent, about 96 percent, about 97 percent, about 98, about 98.5 percent, about 99 percent, or about 99.5 percent.

In some embodiments, the controller 60 is programmed to adjust the purity control valve assembly 16 to selectively i) conduct the gas 20 from the membrane nitrogen generator 12 to the pressure swing absorption nitrogen generator 14 and ii) bypass the gas 20 from the membrane nitrogen generator 12 around the pressure swing absorption nitrogen generator 14 based on an input indicative of at least one ingredient included in a package of consumable ingredients to which the gas 20 is scheduled to be delivered at its point of use 118. The at least one ingredient can include any one or more of oil, seasoning, artificial flavors, vegetable products, animal products, or any other suitable ingredient in packaged foods.

In one example, the point of use 118 includes a first ingredient and other ingredients, the membrane nitrogen generator 12 purifies the gas 20 to the first nitrogen purity of about 95 percent, the pressure swing absorption gas generator 14 further purifies the gas 20 to the second nitrogen purity of about 99.5 percent. The controller 60 receives an input indicative that the point of use 118 will use a second ingredient different from the first ingredient and other ingredients which may be the same or different from before. In response to the use of the second ingredient, the controller 60 causes the gas 20 to bypass the pressure swing absorption gas generator 14 and delivers the gas 20 having the first nitrogen purity of about 95 percent to the point of use 118. Again, other first and second nitrogen purities may be used and 95 percent and 99.5 percent, respectively, are used as examples.

In some embodiments, the controller 60 is programmed to adjust the purity control valve assembly 16 to selectively i) conduct the gas 20 from the membrane nitrogen generator 12 to the pressure swing absorption nitrogen generator 14 and ii) bypass the gas 20 from the membrane nitrogen generator 12 around the pressure swing absorption nitrogen generator 14 based on an input indicative of at least one of an ambient humidity, an ambient temperature, a type of oil to which the gas 20 is scheduled to be delivered, an age of the oil to which the gas 20 is scheduled to be delivered, or other factors. In this way, the nitrogen purity of the gas 20 can be controlled based on conditions of the oil stored for use in processing the food contained in the food packages. The gas 20 may be used to sparge and/or blanket oil tanks and the minimum nitrogen purity desired to do so may change due to weather conditions, if the oil is new or used oil for cleaning cycles, what type of oil (vegetable oil such as corn, canola, sunflower, olive, avocado, fish, coconut, etc.), and other factors. Again, the first nitrogen purity of the gas 20 exiting the membrane nitrogen generator 12 may be adjusted to any desired value.

In some embodiments, the controller 60 is programmed to adjust the purity control valve assembly 16 to selectively i) conduct the gas 20 from the membrane nitrogen generator 12 to the pressure swing absorption nitrogen generator 14 and ii) bypass the gas 20 from the membrane nitrogen generator 12 around the pressure swing absorption nitrogen generator 14 based on an input indicative of at least one of a size of a package to which the gas 20 is scheduled to be delivered, a desired shelf life of the package, and a geographical region to which the package is to be shipped, or other factors. The desired purity of the nitrogen gas for food packages may change based on factors such as the size of the bag/package and how long the food package is desired to remain fresh (shelf life). Such shelf life can be set by local and national preferences around the world and/or depend on the climate of the producing plant, the path traveled during transport, the conditions of the shipping containers during transport, the final destination, and/or other factors. The nitrogen purity of the gas 20 can be adjusted in response to inputting indicative information of those factors to the controller 60 to minimize the resources used in purifying the gas 20. Again, the first nitrogen purity of the gas 20 exiting the membrane nitrogen generator 12 may be adjusted to any desired value.

Figure 5:
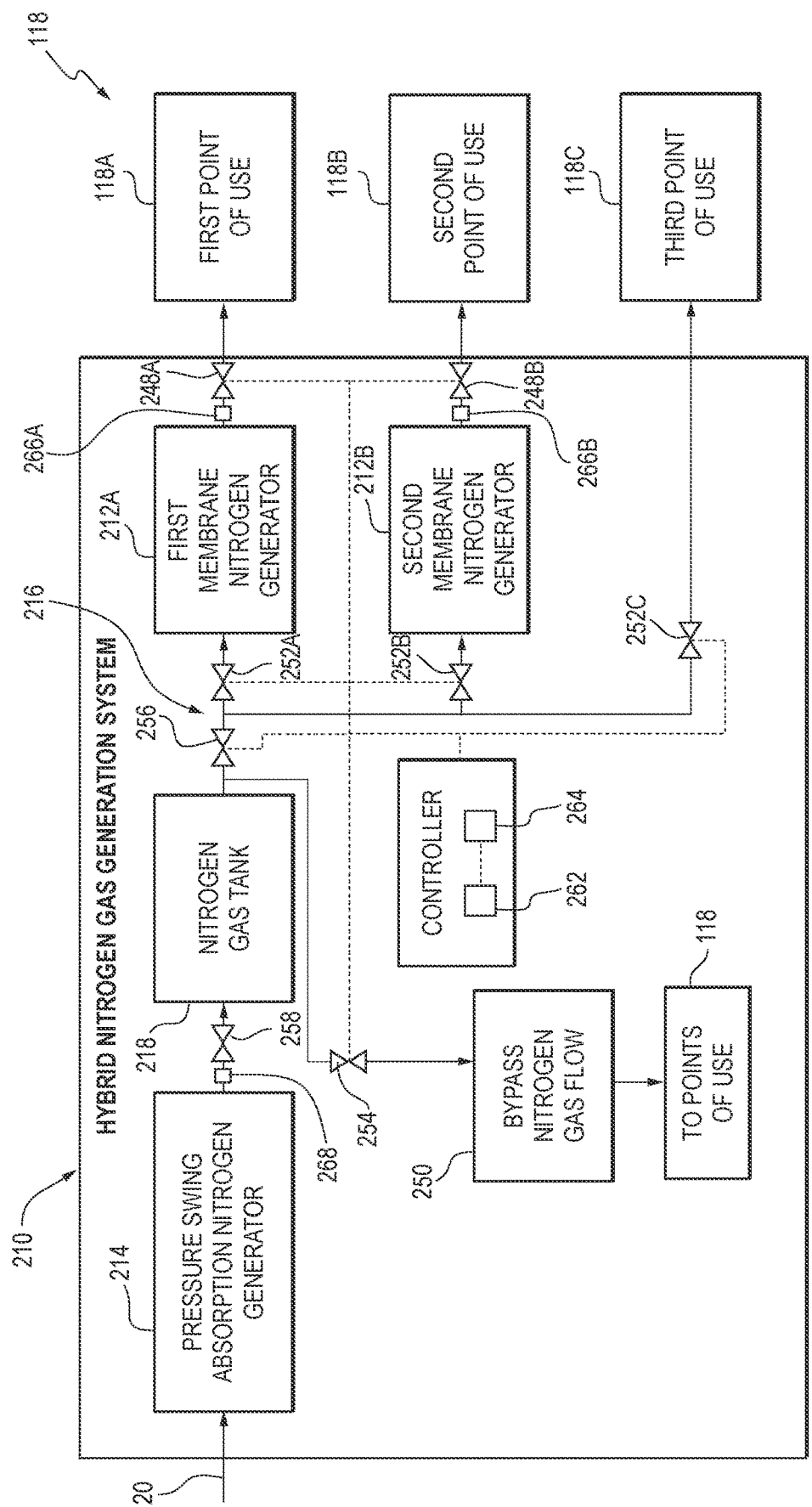
FIG. 5 is a diagrammatic view of a second embodiment of a hybrid nitrogen generation system having a pressure swing absorption nitrogen generator and a membrane nitrogen generator connected in series with and downstream of the pressure swing absorption nitrogen generator.

Another embodiment of a hybrid nitrogen gas generation system 210 in accordance with the present disclosure and configured for use in the nitrogen gas purification circuit 110 is shown in FIG. 5. The hybrid nitrogen gas generation system 210 is substantially similar to the hybrid nitrogen gas generation system 10 shown in FIGS. 1-4 and described herein. Accordingly, similar reference numbers in the 200 series indicate features that are common between the hybrid nitrogen gas generation system 210 and the hybrid nitrogen gas generation system 10. The description of the hybrid nitrogen gas generation system 210 is incorporated by reference to apply to the hybrid nitrogen gas generation system 10, except in instances when it conflicts with the specific description and the drawings of the hybrid nitrogen gas generation system 210.

In contrast to the hybrid nitrogen gas generation system 10, the hybrid nitrogen gas generation system 210 conducts the gas 20 first through a pressure swing absorption nitrogen generator 214 and then optionally through one or more membrane nitrogen generators 212 to further purify the gas 20 as shown in FIG. 5. In a theoretical sense, the gas 20 may be purified using the pressure swing absorption nitrogen generator 14, 214 and the membrane nitrogen generator 12, 212 in any order. However, as a practical matter, membrane nitrogen generators 12, 212 are typically much smaller than pressure swing absorption nitrogen generators 14, 214. As such, a membrane nitrogen generator 12, 212 can be more easily located and used at each point of use 118 as shown in FIG. 5 to allow for a uniquely adjustable nitrogen purity for each point of use 118.

In the illustrative embodiment, a first membrane nitrogen generator 212A is located at a first point of use 118A in a facility as shown in FIG. 5. A second membrane nitrogen generator 212B is located at a second point of use 118B. Even still, any number of points of use 118, each having an associated membrane nitrogen generator, may be used. A third point of use 118C is fluidly connected to a nitrogen buffer tank 218 to receive the gas 20 having the purity from the pressure swing absorption nitrogen generator 214 without being further purified by a membrane nitrogen generator. In other embodiments, a third membrane nitrogen generator may be fluidly connected between the pressure swing absorption nitrogen generator 214 and the third point of use 118C. Alternatively, the first or second membrane nitrogen generators 212A, 212B may be fluidly connected to multiple points of use 118.

As an example, the first point of use 118A is a bagmaker (or multiple bagmakers) configured to form a bag for receiving food product, fill the bag with food product, conduct the gas 20 into the bag, and seal the bag. The bagmaker may be a horizontal or vertical type machine. The second point of use 118B is also a bagmaker (or multiple bagmakers) of a different model as compared to the bagmaker used at the first point of use 118B. The third point of use 118C is an oil tank that stores oil used for processing the food products. Other points of use and fluid connections therebetween may also be used. The purity of the nitrogen in the gas 20 may be varied based upon the model of the bagmaker to which the gas 20 is being delivered.

The hybrid nitrogen gas generation system 210 includes the pressure swing absorption nitrogen generator 214, a nitrogen buffer tank 218 fluidly connected downstream of the pressure swing absorption nitrogen generator 214, the first and second membrane nitrogen generators 212A, 212B, a purity control valve assembly 216, and a controller 260 as shown in FIG. 5.

The purity control valve assembly 216 is fluidly connected between the pressure swing absorption nitrogen generator 214 and the membrane nitrogen generators 212A, 212B as shown in FIG. 5. The purity control valve assembly 216 is configured to selectively direct the purified gas 20 from the pressure swing absorption generator 14 to one or more of the membrane nitrogen generators 212A, 212B or to bypass a flow 250 of the purified gas 20 around the one or more of the membrane nitrogen generators 212A, 212B. The bypass flow 250 is fluidly connected to each of the points of use 118 in the illustrative embodiment.

The purity control valve assembly 216 includes a plurality of valves 248A, 248B, 252A, 252B, 252C, 254, 256, 258 for controlling the flow of gas 20 as shown in FIG. 5. The valves 248A, 248B control the flow of gas from each of the first and second membrane nitrogen generators 212A, 212B to their respective points of use 118A, 118B. The valves 248A, 248B may be used to control the backpressure on the membrane nitrogen generators 212A, 212B. The valves 252A, 252B, 252C control the flow of gas 20 from the nitrogen buffer tank 218 toward each of the different paths for the points of use 118. The valve 254 is connected between the nitrogen buffer tank 218 and the points of use 118 to bypass the membrane nitrogen generators 212A, 212B. The valve 256 is optional and is connected between the nitrogen buffer tank 218 and the valves 252A, 252B to provide a single shut off valve. The valve 258 is located downstream of the pressure swing absorption nitrogen generator 214 and is used to control the backpressure of the pressure swing absorption nitrogen generator 214 and, thus, the nitrogen purity of the gas 20 exiting the pressure swing absorption nitrogen generator 214.

The controller 260 includes memory 262 and a processor 264 as shown in FIG. 5. The controller 260 is connected to the valves 248A, 248B, 252A, 252B, 252C, 254, 256, 258 of the purity control valve assembly 216 and is configured to control said valves.

The controller 260 further includes sensor arrays 266A, 266B and a sensor array 268 as shown in FIG. 5. The sensor arrays 266A, 266B are located downstream of the membrane nitrogen generators 212A, 212B respectively. The sensor array 268 is located immediately downstream of the pressure swing absorption nitrogen generator 214. The sensor arrays 266A, 266B, 268 each include one or more sensors for determining a flow rate of the gas 20 exiting the generators 212A, 212B, 214, respectively and for determining the nitrogen purity of the gas 20 exiting the generators 212A, 212B, 214, respectively. The controller 60 is programmed to make decisions and control the purity control valve assembly 216 based on the flow rate and/or nitrogen purity of the gas 20 as determined with the sensor arrays 266A, 266B, 268. In the illustrative embodiment, the sensor arrays 266A, 266B, 268 each include an oxygen sensor that detects the oxygen content in the gas 20.

The pressure swing absorption nitrogen generator 214 includes a first tower and a second tower and is configured to purify the gas 20 comprising nitrogen to a first nitrogen purity. The first membrane nitrogen generator 212A and the second membrane nitrogen generator 212B each include one or more vessels and a plurality of fibers located in each of the one or more vessels. The first membrane nitrogen generator 212A is fluidly connected to and downstream of the pressure swing absorption nitrogen generator 214 and configured to purify the gas to a second nitrogen purity. The second membrane nitrogen generator 212B is fluidly connected to and downstream of the pressure swing absorption nitrogen generator 214 and configured to purify the gas to a third nitrogen purity The purity control valve assembly 216 is fluidly connected with the pressure swing absorption nitrogen generator 214 and the first and second membrane nitrogen generators 212A, 212B as shown in FIG. 5. The purity control valve assembly 216 is configured to selectively i) conduct the gas 20 from the pressure swing absorption nitrogen generator 214 to the first membrane nitrogen generator 212 to cause the hybrid nitrogen gas generation system 210 to provide gas 20 having the second nitrogen purity and ii) bypass the gas 20 from the pressure swing absorption nitrogen generator 214 around the first membrane nitrogen generator 212A to cause the hybrid nitrogen gas generation system 210 to provide gas 20 having the first nitrogen purity to a point of use 118. Similar options are provided for the second membrane nitrogen generator 212B and any further Nth number of membrane nitrogen generators.

The controller 260 is connected with the backpressure valve 248A and programmed to cause the backpressure valve 248A to vary a backpressure of the first membrane nitrogen generator 212A to adjust the second nitrogen purity of the gas 20 exiting the first membrane nitrogen generator 212A as suggested in FIG. 5. The controller 260 is connected with the backpressure valve 248B and programmed to cause the backpressure valve 248B to vary a backpressure of the second membrane nitrogen generator 212B to adjust the third nitrogen purity of the gas 20 exiting the second membrane nitrogen generator 212B. A number of examples and scenarios for the controller 260 are provided. The controller 260 may be programmed for any one, any combination, or all such examples for the systems 10, 210.

A flow diagram 400 is shown in FIG. 7 showing illustrative instructions for the memory 262. At step 402, the pressure swing absorption nitrogen generator 214 produces a gas 20 with the first nitrogen purity. At step 404, the controller 260 determines if the first nitrogen purity is desired for the points of use 118. The controller 260 can vary the cycles of the pressure swing absorption nitrogen generator 214 in some conditions to adjust the first nitrogen purity. If the first nitrogen purity is equal to or greater than the desired level, the gas 20 is bypassed around the membrane nitrogen generator 212 to the point(s) of use 118 at step 406. If not, the controller 260 directs the gas 20 to the membrane nitrogen generator 212 and varies the backpressure on the membrane nitrogen generator 212 to obtain the desired nitrogen purity and then directs the gas 20 to the points of use 118 at step 408. If multiple membrane nitrogen generators 212 are used, each one is adjusted to the desired nitrogen purity based on the associated downstream point of use 118.

Examples provided below that are similar to the examples provided for controller 60 may be programmed as such for similar reasons as explained for the controller 60. The examples are provided for the first membrane nitrogen generator 212A; however, the controller 260 is programmed to make the same determinations and responses for any number of membrane nitrogen generators 212 and points of use 118.

In some embodiments, the controller 260 is programmed to adjust the backpressure valve 248A to selectively vary the backpressure of the first membrane nitrogen generator 212A to adjust the second nitrogen purity of the gas exiting the first membrane nitrogen generator 212A based on an input indicative of at least one ingredient included in a package of consumable ingredients to which the gas 20 is scheduled to be delivered. In the illustrative embodiment, the package of consumable ingredients is made at the first point of use 118A using a bagmaker.

In some embodiments, the controller 260 is programmed to adjust the backpressure valve 248A to selectively vary the backpressure of the first membrane nitrogen generator 212A to adjust the second nitrogen purity of the gas 20 exiting the first membrane nitrogen generator 212A based on an input indicative of at least one of an ambient humidity, an ambient temperature, a type of oil to which the gas 20 is scheduled to be delivered, an age of the oil to which the gas 20 is scheduled to be delivered and/or other factors. In some embodiments, the controller 260 is programmed to adjust the backpressure valve 248A to selectively vary the backpressure of the first membrane nitrogen generator 212A to adjust the second nitrogen purity of the gas 20 exiting the first membrane nitrogen generator 212A based on an input indicative of at least one of a size of a package to which the gas 20 is scheduled to be delivered, a desired shelf life of the package, a geographical region to which the package is to be shipped, and/or other factors.

As shown in FIG. 5, the second membrane nitrogen generator 212B is fluidly connected with the pressure swing absorption nitrogen generator 214 and nitrogen buffer tank 218 in parallel with the first membrane nitrogen generator 212A. The second membrane nitrogen generator 212B is configured to purify the gas 20 to a nitrogen purity independent of the first membrane nitrogen generator 212A. Thus, the first membrane nitrogen generator 212A is configured to deliver the gas 20 with a nitrogen purity to the first point of use 118A and the second membrane nitrogen generator 212B is configured to deliver the gas 20 with the same or different nitrogen purity to the second point of use 118B.

According to an aspect of the disclosure, a method of operating a hybrid nitrogen gas generation system 10, 210 includes directing a gas 20 comprising nitrogen into one of a pressure swing absorption nitrogen generator 14, 214 and a membrane nitrogen generator 12, 212 to purify the gas 20 to a first nitrogen purity level, and directing the gas 20 into the other one of the pressure swing absorption nitrogen generator 14, 214 and the membrane nitrogen generator 12, 212 to purify the gas 20 to a second nitrogen purity level after directing the gas 20 into the one of the pressure swing absorption nitrogen generator 14, 214 and the membrane nitrogen generator 12, 212.

The method may further include bypassing the gas 20 around the other one of the pressure swing absorption nitrogen generator 14, 214 and the membrane nitrogen generator 12, 212 for a period of time after directing the gas 20 into the one of the pressure swing absorption nitrogen generator 14, 214 and the membrane nitrogen generator 12, 212 and before directing the gas 20 into the other one of the pressure swing absorption nitrogen generator 14, 214 and the membrane nitrogen generator 12, 212. The method may further include varying a backpressure of the membrane nitrogen generator 12, 212 to adjust at least one of the first nitrogen purity and the second nitrogen purity.

Conventional pressure swing absorption nitrogen generation systems may be beneficial for high nitrogen purity applications; however, such systems may be expensive with corresponding high installation costs. Twin tower pressure swing absorption nitrogen generation systems can be physically large such that the facility housing the system will be designed to be larger than if such a system is not used. Due to the costs associated with conventional pressure swing absorption nitrogen generation systems, backup systems may not be affordable in cost or physical space. Modular pressure swing absorption systems may be thirty percent or more expensive than typical systems. Moreover, conventional membrane generation systems may be inefficient for high nitrogen purity applications such as about 95 percent nitrogen purity or greater.

The present disclosure provides hybrid nitrogen gas generation systems 10, 210 that leverage capabilities of membrane and pressure swing absorption nitrogen generation systems. The systems of the present disclosure may provide capital cost reductions, standardized components, smaller pressure swing absorption system, and reduce blow-down and purge loss during regeneration of the pressure swing absorption system.

In some examples, the membrane generator provides 95 percent pure nitrogen from compressed air. The 95 percent pure nitrogen may be fed into the pressure swing absorption generator to further purify the gas to about 99.5 percent nitrogen. The system allows for a smaller pressure swing absorption generator as compared to a system without both the pressure swing absorption and membrane generators. In the event where one of the generators fails or is non-functional, the other generator can produce 99.5 percent, or other purity level, nitrogen as a backup. The relatively smaller pressure swing absorption system may cost less, have reduced transportation and installation cost and be installed in a physical smaller in facility.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

Aspects of the invention are also set out in the following set of numbered clauses in which is described:

1. A hybrid nitrogen gas generation system comprising:
   a. a membrane nitrogen generator that includes a vessel and a plurality of fibers located in the vessel, the membrane nitrogen generator configured to purify gas comprising nitrogen to a first nitrogen purity,
   b. a pressure swing absorption nitrogen generator that includes a first tower and a second tower, the pressure swing absorption nitrogen generator being fluidly connected to and located downstream of the membrane nitrogen generator and configured to further purify the gas to a second nitrogen purity, and c. a purity control valve assembly fluidly connected between the membrane nitrogen generator and the pressure swing absorption nitrogen generator. The purity control valve assembly configured to selectively i) conduct the gas from the membrane nitrogen generator to the pressure swing absorption nitrogen generator to cause the hybrid nitrogen gas generation system to provide the gas having the second nitrogen purity and ii) bypass the gas from the membrane nitrogen generator around the pressure swing absorption nitrogen generator to cause the hybrid nitrogen gas generation system to provide the gas having the first nitrogen purity.

2. The hybrid nitrogen gas generation system of clause 1, further comprising a controller connected with the purity control valve assembly.

3. The hybrid nitrogen gas generation system of clause 2, wherein the controller is programmed to cause the purity control valve assembly to bypass the gas around the pressure swing absorption nitrogen generator in response to one of the second nitrogen purity being less than a predetermined threshold nitrogen purity and a flow rate of the gas exiting the pressure swing absorption nitrogen generator being below a predetermined flow rate.

4. The hybrid nitrogen gas generation system of clause 3, wherein the predetermined threshold nitrogen purity is about 95 percent.

5. The hybrid nitrogen gas generation system of any one of clauses 2 to 4, wherein the controller is further programmed to cause the purity control valve assembly to increase a backpressure of the membrane nitrogen generator in response to the second nitrogen purity being less than the predetermined threshold nitrogen purity to further cause the first nitrogen purity of the gas exiting the membrane nitrogen generator to be increased.

6. The hybrid nitrogen gas generation system of any one of clauses 2 to 5, wherein the controller is programmed to adjust the purity control valve assembly to selectively i) conduct the gas from the membrane nitrogen generator to the pressure swing absorption nitrogen generator and ii) bypass the gas from the membrane nitrogen generator around the pressure swing absorption nitrogen generator based on an input indicative of at least one ingredient included in a package of consumable ingredients to which the gas is scheduled to be delivered.

7. The hybrid nitrogen gas generation system of any one of clauses 2 to 6, wherein the controller is programmed to adjust the purity control valve assembly to selectively i) conduct the gas from the membrane nitrogen generator to the pressure swing absorption nitrogen generator and ii) bypass the gas from the membrane nitrogen generator around the pressure swing absorption nitrogen generator based on an input indicative of at least one of an ambient humidity, an ambient temperature, a type of oil to which the gas is scheduled to be delivered, and an age of the oil to which the gas is scheduled to be delivered.

8. The hybrid nitrogen gas generation system of any one of clauses 2 to 7, wherein the controller is programmed to adjust the purity control valve assembly to selectively i) conduct the gas from the membrane nitrogen generator to the pressure swing absorption nitrogen generator and ii) bypass the gas from the membrane nitrogen generator around the pressure swing absorption nitrogen generator based on an input indicative of at least one of a size of a package to which the gas is scheduled to be delivered, a desired shelf life of the package, and a geographical region to which the package is to be shipped.

9. The hybrid nitrogen gas generation system of any one of clauses 2 to 8, wherein the controller is programmed to cause the purity control valve assembly to vary a backpressure of the membrane nitrogen generator to adjust the first nitrogen purity of the gas exiting the membrane nitrogen generator.

10. The hybrid nitrogen gas generation system of any one of clauses 1 to 9, wherein the purity control valve assembly includes one of i) a three-way valve coupled between the membrane nitrogen generator and the pressure swing absorption nitrogen generator and ii) a first conduit with a first valve for bypassing the pressure swing absorption nitrogen generator and a second conduit with a second valve coupled between the membrane nitrogen generator and the pressure swing absorption nitrogen generator.

11. A hybrid nitrogen gas generation system comprising:
a. a pressure swing absorption nitrogen generator that includes a first tower and a second tower, the pressure swing absorption nitrogen generator configured to purify a gas comprising nitrogen to a first nitrogen purity,
b. a first membrane nitrogen generator that includes a vessel and a plurality of fibers located in the vessel, the first membrane nitrogen generator being fluidly connected to and downstream of the pressure swing absorption nitrogen generator and configured to purify the gas to a second nitrogen purity, and
c. a purity control valve assembly fluidly connected between the pressure swing absorption nitrogen generator and the first membrane nitrogen generator, the purity control valve assembly configured to selectively i) conduct the gas from the pressure swing absorption nitrogen generator to the first membrane nitrogen generator to cause the hybrid nitrogen gas generation system to provide the gas having the second nitrogen purity and ii) bypass the gas from the pressure swing absorption nitrogen generator around the first membrane nitrogen generator to cause the hybrid nitrogen gas generation system to provide the gas having the first nitrogen purity.

12. The hybrid nitrogen gas generation system of clause 11, further comprising a backpressure valve located downstream of the first membrane nitrogen generator and a controller connected with the backpressure valve and programmed to cause the backpressure valve to vary a backpressure of the first membrane nitrogen generator to adjust the second nitrogen purity of the gas exiting the first membrane nitrogen generator.

13. The hybrid nitrogen gas generation system of clause 12, wherein the controller is programmed to adjust the backpressure valve to selectively vary the backpressure of the first membrane nitrogen generator to adjust the second nitrogen purity of the gas exiting the first membrane nitrogen generator based on an input indicative of at least one ingredient included in a package of consumable ingredients to which the gas is scheduled to be delivered.

14. The hybrid nitrogen gas generation system of any one of clauses 12 to 13, wherein the controller is programmed to adjust the backpressure valve to selectively vary the backpressure of the first membrane nitrogen generator to adjust the second nitrogen purity of the gas exiting the first membrane nitrogen generator based on an input indicative of at least one of an ambient humidity, an ambient temperature, a type of oil to which the gas is scheduled to be delivered, and an age of the oil to which the gas is scheduled to be delivered.

15. The hybrid nitrogen gas generation system of any one of clauses 12 to 14, wherein the controller is programmed to adjust the backpressure valve to selectively vary the backpressure of the first membrane nitrogen generator to adjust the second nitrogen purity of the gas exiting the first membrane nitrogen generator based on an input indicative of at least one of a size of a package to which the gas is scheduled to be delivered, a desired shelf life of the package, and a geographical region to which the package is to be shipped.

16. The hybrid nitrogen gas generation system of any one of clauses 10 to 15, further comprising a second membrane nitrogen generator being fluidly connected to and downstream of the pressure swing absorption nitrogen generator and configured to purify the gas to a third nitrogen purity.

17. The hybrid nitrogen gas generation system of clause 16, wherein the first membrane nitrogen generator is fluidly connected with the pressure swing absorption nitrogen generator in parallel with the second membrane nitrogen generator.

18. The hybrid nitrogen gas generation system of clause 17, wherein the third nitrogen purity is different than the second nitrogen purity.

19. A method of operating a hybrid nitrogen gas generation system, the method comprising
  a. directing a gas comprising nitrogen into one of a pressure swing absorption nitrogen generator and a membrane nitrogen generator to purify the gas to a first nitrogen purity, and
  b. directing the gas into the other one of the pressure swing absorption nitrogen generator and the membrane nitrogen generator to purify the gas to a second nitrogen purity after directing the gas into the one of the pressure swing absorption nitrogen generator and the membrane nitrogen generator.

20. The method of clause 19, further comprising bypassing the gas around the other one of the pressure swing absorption nitrogen generator and the membrane nitrogen generator for a period of time after directing the gas into the one of the pressure swing absorption nitrogen generator and the membrane nitrogen generator and before directing the gas into the other one of the pressure swing absorption nitrogen generator and the membrane nitrogen generator.

21. The method of any one of clause 19 to 20, further comprising varying a backpressure of the membrane nitrogen generator to adjust at least one of the first nitrogen purity and the second nitrogen purity.

The invention claimed is:

1. A hybrid nitrogen gas generation system comprising:
  a membrane nitrogen generator that includes a vessel and a plurality of fibers located in the vessel, the membrane nitrogen generator configured to purify gas comprising nitrogen to a first nitrogen purity,
  a pressure swing absorption nitrogen generator that includes a first tower and a second tower, the pressure swing absorption nitrogen generator being fluidly connected to and located downstream of the membrane nitrogen generator and configured to further purify the gas to a second nitrogen purity, and
  a purity control valve assembly fluidly connected between the membrane nitrogen generator and the pressure swing absorption nitrogen generator, the purity control valve assembly configured to selectively i) conduct the gas from the membrane nitrogen generator to the pressure swing absorption nitrogen generator to cause the hybrid nitrogen gas generation system to provide the gas having the second nitrogen purity and ii) bypass the gas from the membrane nitrogen generator around the pressure swing absorption nitrogen generator to cause the hybrid nitrogen gas generation system to provide the gas having the first nitrogen purity.

2. The hybrid nitrogen gas generation system of claim 1, further comprising a controller connected with the purity control valve assembly, the controller programmed to cause the purity control valve assembly to bypass the gas around the pressure swing absorption nitrogen generator in response to one of the second nitrogen purity being less than a predetermined threshold nitrogen purity and a flow rate of the gas exiting the pressure swing absorption nitrogen generator being below a predetermined flow rate.

3. The hybrid nitrogen gas generation system of claim 2, wherein the predetermined threshold nitrogen purity is about 95 percent.

4. The hybrid nitrogen gas generation system of claim 2, wherein the controller is further programmed to cause the purity control valve assembly to increase a backpressure of the membrane nitrogen generator in response to the second nitrogen purity being less than the predetermined threshold nitrogen purity to further cause the first nitrogen purity of the gas exiting the membrane nitrogen generator to be increased.

5. The hybrid nitrogen gas generation system of claim 1, further comprising a controller connected with the purity control valve assembly, the controller programmed to adjust the purity control valve assembly to selectively i) conduct the gas from the membrane nitrogen generator to the pressure swing absorption nitrogen generator and ii) bypass the gas from the membrane nitrogen generator around the pressure swing absorption nitrogen generator based on an input indicative of at least one ingredient included in a package of consumable ingredients to which the gas is scheduled to be delivered.

6. The hybrid nitrogen gas generation system of claim 1, further comprising a controller connected with the purity control valve assembly, the controller programmed to adjust the purity control valve assembly to selectively i) conduct the gas from the membrane nitrogen generator to the pressure swing absorption nitrogen generator and ii) bypass the gas from the membrane nitrogen generator around the pressure swing absorption nitrogen generator based on an input indicative of at least one of an ambient humidity, an ambient temperature, a type of oil to which the gas is scheduled to be delivered, and an age of the oil to which the gas is scheduled to be delivered.

7. The hybrid nitrogen gas generation system of claim 1, further comprising a controller connected with the purity control valve assembly, the controller programmed to adjust the purity control valve assembly to selectively i) conduct the gas from the membrane nitrogen generator to the pressure swing absorption nitrogen generator and ii) bypass the gas from the membrane nitrogen generator around the pressure swing absorption nitrogen generator based on an input indicative of at least one of a size of a package to which the gas is scheduled to be delivered, a desired shelf life of the package, and a geographical region to which the package is to be shipped.

8. The hybrid nitrogen gas generation system of claim 1, further comprising a controller connected with the purity control valve assembly and the controller is programmed to cause the purity control valve assembly to vary a backpressure of the membrane nitrogen generator to adjust the first nitrogen purity of the gas exiting the membrane nitrogen generator.

9. The hybrid nitrogen gas generation system of claim 1, wherein the purity control valve assembly includes one of i) a three-way valve coupled between the membrane nitrogen generator and the pressure swing absorption nitrogen generator and ii) a first conduit with a first valve for bypassing the pressure swing absorption nitrogen generator and a second conduit with a second valve coupled between the membrane nitrogen generator and the pressure swing absorption nitrogen generator.

10. A hybrid nitrogen gas generation system comprising:
a pressure swing absorption nitrogen generator that includes a first tower and a second tower, the pressure swing absorption nitrogen generator configured to purify a gas comprising nitrogen to a first nitrogen purity,
a first membrane nitrogen generator that includes a vessel and a plurality of fibers located in the vessel, the first membrane nitrogen generator being fluidly connected to and downstream of the pressure swing absorption nitrogen generator and configured to purify the gas to a second nitrogen purity, and
a purity control valve assembly fluidly connected between the pressure swing absorption nitrogen generator and the first membrane nitrogen generator, the purity control valve assembly configured to selectively i) conduct the gas from the pressure swing absorption nitrogen generator to the first membrane nitrogen generator to cause the hybrid nitrogen gas generation system to provide the gas having the second nitrogen purity and ii) bypass the gas from the pressure swing absorption nitrogen generator around the first membrane nitrogen generator to cause the hybrid nitrogen gas generation system to provide the gas having the first nitrogen purity.

11. The hybrid nitrogen gas generation system of claim 10, further comprising a backpressure valve located downstream of the first membrane nitrogen generator and a controller connected with the backpressure valve and programmed to cause the backpressure valve to vary a backpressure of the first membrane nitrogen generator to adjust the second nitrogen purity of the gas exiting the first membrane nitrogen generator.

12. The hybrid nitrogen gas generation system of claim 11, wherein the controller is programmed to adjust the backpressure valve to selectively vary the backpressure of the first membrane nitrogen generator to adjust the second nitrogen purity of the gas exiting the first membrane nitrogen generator based on an input indicative of at least one ingredient included in a package of consumable ingredients to which the gas is scheduled to be delivered.

13. The hybrid nitrogen gas generation system of claim 11, wherein the controller is programmed to adjust the backpressure valve to selectively vary the backpressure of the first membrane nitrogen generator to adjust the second nitrogen purity of the gas exiting the first membrane nitrogen generator based on an input indicative of at least one of an ambient humidity, an ambient temperature, a type of oil to which the gas is scheduled to be delivered, and an age of the oil to which the gas is scheduled to be delivered.

14. The hybrid nitrogen gas generation system of claim 11, wherein the controller is programmed to adjust the backpressure valve to selectively vary the backpressure of the first membrane nitrogen generator to adjust the second nitrogen purity of the gas exiting the first membrane nitrogen generator based on an input indicative of at least one of a size of a package to which the gas is scheduled to be delivered, a desired shelf life of the package, and a geographical region to which the package is to be shipped.

15. The hybrid nitrogen gas generation system of claim 10, further comprising a second membrane nitrogen generator being fluidly connected to and downstream of the pressure swing absorption nitrogen generator and configured to purify the gas to a third nitrogen purity.

16. The hybrid nitrogen gas generation system of claim 15, wherein the first membrane nitrogen generator is fluidly connected with the pressure swing absorption nitrogen generator in parallel with the second membrane nitrogen generator.

17. The hybrid nitrogen gas generation system of claim 16, wherein the third nitrogen purity is different than the second nitrogen purity.

* * * * *